Patented Jan. 27, 1925.

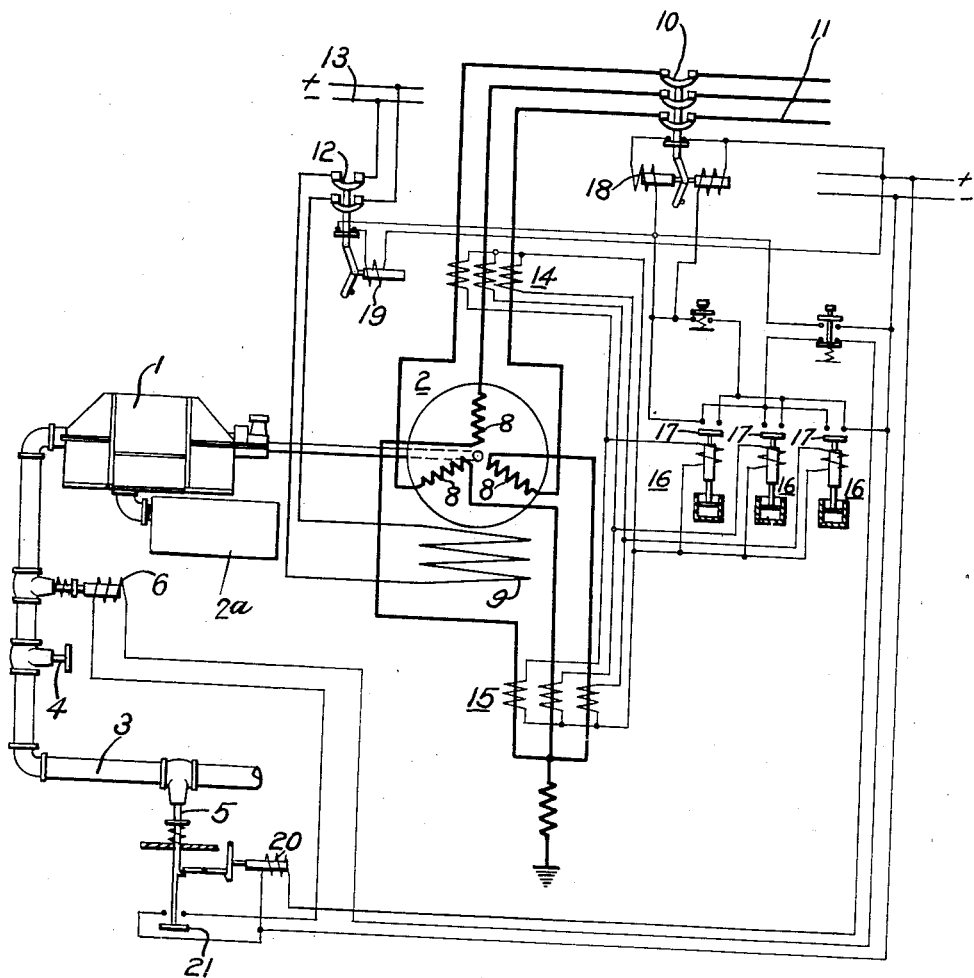

1,524,562

UNITED STATES PATENT OFFICE.

JAN ARTHUR KUYSER, OF SALE, ENGLAND, ASSIGNOR TO WESTINGHOUSE ELECTRIC & MANUFACTURING COMPANY, A CORPORATION OF PENNSYLVANIA.

PROTECTIVE SYSTEM.

Application filed January 26, 1922. Serial No. 531,985.

*To all whom it may concern:*

Be it known that I, JAN ARTHUR KUYSER, a subject of the Queen of Netherlands, and a resident of Sale, in the county of Chester, England, have invented a new and useful Improvement in Protective Systems, of which the following is a specification.

My invention relates to protective systems and particularly to systems designed to protect turbine driven generators.

One object of my invention is to provide a system whereby a turbine-driven generator may be quickly stopped upon the occurrence of a faulty condition in the generator windings to preclude aggravation of such fault.

A further object of my invention is to provide means whereby the opposition of the rotation of a turbine-driven apparatus may be quickly increased to a value that will serve to quickly reduce the speed of the turbine and bring it to rest.

A further object of my invention is to provide a system whereby a turbine-driven generator may be disconnected as a unit both from the source of motive fluid and from the electrical circuit to which the generator is connected, upon the occurrence of faulty condition in the rotating unit, and the air pressure within the turbine increased to increase the opposition to further rotation thereof.

In steam turbine generating plants, it has been proposed to automatically disconnect the generator from the bus-bars and open the field circuit of the generator upon the occurrence of a ground or electric fault in the windings of the generator. Protective systems of this nature usually trip, by means of a relay, the main circuit breaker between the generator and the bus-bars and simultaneously open the excitation circuit of the turbo generator, either upon a discharge resistance or completely. It has also been proposed to arrange that, independently of the usual emergency governor trip, the supply of steam to the turbine shall be cut off when the main circuit-breaker opens, the steam valve being closed somewhat in advance of the opening of the circuit breaker, in order that the turbine will not tend to race when the load is thrown off the generator.

In practicing my invention, I provide means that are operated upon the occurrence of a fault in the generator for disconnecting the generator windings from the circuit to which it may be connected and for disconnecting the field magnet windings from the source of excitation.

I also provide means whereby a valve is actuated to preclude flow of fluid to the turbine and further, in accordance with my invention, means for breaking the vacuum of the turbine condenser. This may be effected in various ways. The method that I particularly show and describe consists in opening the turbine to the outer air whereupon such air serves to resist the rotation of the moving element of the turbine and to quickly bring it to rest.

With large steam turbines as now constructed, it is important that the vacuum should not be broken before the main steam valve has been closed and, in order to prevent this, an electrical or other interlock is preferably provided between the main steam valve and the vacuum break valve in such a manner that the latter acts to break the vacuum after, and not before, the main steam valve has closed.

The single figure of the accompanying drawing is a diagrammatic view of a turbine-driven generator illustrating the arrangement and disposition of the controlling valves and the connection of the control relays to the operating mechanism for the valves.

In the accompanying drawing, the turbine-driven unit comprises a turbine 1 a generator 2 and a condenser 2ª. The turbine is actuated by motive fluid which is conducted thereto by a pipe system 3 from a suitable source of fluid. The flow of fluid to the turbine 1 is controlled by a manually-operable valve 4 and an automatically-operable valve 5, the actuation of which is effected upon the occurrence of faulty conditions within the generator 2. An additional normally closed valve 6 is disposed in the pipe system 3 to control the admission of air to the turbine, when actuated, in response to abnormal conditions in the generator.

The generator 2 comprises a plurality of armature windings 8 and a field magnet winding 9. The armature windings 8 are connected through a circuit interrupter 10 to a distributing system. The field magnet winding 9 is connected through a circuit interrupter 12 to a suitable source 13 of excitation, The windings 8 of the generator 2 are protected by a plurality of current transformers 14 and 15 that are operatively connected to a plurality of relays 16 to effect the actuation thereof upon the occurrence of faulty conditions in the generator windings 8. Upon the occurrence of abnormal conditions within the generator, the relays 16 operate to close their respective switches 17 which serve to effect the energization of the trip coils 18 and 19 of the interrupters 10 and 12, respectively. Upon the actuation of the interrupters 10 and 12, the windings 8 and 9 of the generator are immediately disconnected from the respective circuits to which they were connected.

Simultaneously with the energization of the trip coils 18 and 19 of the interrupters 10 and 12, the operating coil 20 of the valve 5 is energized to release the actuating spring thereof to permit the valve 5 to be closed, whereupon the further flow of fluid to the turbine 1 is precluded. When the valve 5 is closed, an auxiliary interlock switch 21, simultaneously controlled therewith, is closed to complete a circuit that serves to energize the operating coil of the auxiliary vacuum-controlling valve 6 to open the valve to permit outer air to enter the turbine 1.

While I have shown a particular method of breaking the vacuum in the condenser in response to abnormal conditions in the generator windings, it will be understood that the object of my invention may be accomplished in various ways to effect the quick stopping of the turbine-driven unit by other methods of breaking the vacuum in the condenser in response to any predetermined abnormal conditions of the unit as a whole without departing from the spirit and scope of my invention, as set forth in the appended claims.

I claim as my invention:

1. The combination with a generator, a turbine for driving the generator, a condenser for maintaining a low degree of air pressure in the turbine, and means for connecting the generator to an electric circuit, of means actuated upon the occurrence of abnormal conditions in the generator for simultaneously disconnecting the generator from the circuit, discontinuing the excitation of the generator and for increasing the pressure in the turbine condenser.

2. In combination, a generator comprising armature and field magnet windings, a distribution circuit and an excitation circuit, and means for connecting the windings to the corresponding circuits, a turbine for driving the generator, a source of energy for the turbine, and a condenser for controlling the pressure within the turbine, of means responsive to abnormal conditions in the generator windings for disconnecting the windings from the circuits and rendering the condenser ineffective for controlling the pressure in the turbine.

3. The combination with a turbine-driven apparatus, and a condenser for maintaining a low pressure in the turbine to reduce windage losses, of means operative upon the occurrence of abnormal conditions in a portion of the apparatus for discontinuing the admission of motive fluid to the turbine and for rendering the condenser ineffective to control the pressure therein.

4. The combination with a turbine-driven apparatus, and a condenser for maintaining a low pressure in the turbine to reduce windage losses, of a plurality of devices adapted to operate upon the occurrence of abnormal conditions in the turbine-driven apparatus as a unit, and means controlled by the devices and severally operative to preclude further admission of motive fluid to the turbine and for effecting an increase in the opposition to the rotation of the turbine.

5. The combination with a turbine-driven apparatus, and a condenser for maintaining a low pressure in the turbine to reduce windage losses, of means actuated under predetermined conditions for precluding further actuation of the turbine and for increasing the windage opposition.

6. The combination with a fluid-driven turbine, a source of motive fluid therefor and an apparatus driven by the turbine, of means actuated in response to abnormal conditions in the turbine-driven apparatus for precluding further flow of fluid to the turbine, and means for effectively increasing the resistance to further rotation of the turbine.

7. The combination with a turbine-driven generator, a source of motive fluid for the turbine and a condenser for maintaining a low degree of pressure in the turbine, of a valve between the turbine and the source of motive fluid therefor, a second valve for admitting air to the turbine and means responsive to abnormal conditions in the generator for controlling the actuation of both valves.

In testimony whereof, I have hereunto subscribed my name this fifth day of January 1922.

JAN ARTHUR KUYSER.